United States Patent
Allen

(10) Patent No.: US 12,073,335 B2
(45) Date of Patent: *Aug. 27, 2024

(54) TECHNOLOGIES FOR EVALUATING RELATIONSHIPS BETWEEN SOCIAL NETWORKING PROFILES

(71) Applicant: Pairity, Inc., Austin, TX (US)

(72) Inventor: Gregory Allen, Brooklyn, NY (US)

(73) Assignee: Pairity, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,812

(22) Filed: Sep. 6, 2022

(65) Prior Publication Data

US 2022/0414506 A1    Dec. 29, 2022

Related U.S. Application Data

(63) Continuation of application No. 16/668,668, filed on Oct. 30, 2019, now Pat. No. 11,436,513, which is a continuation of application No. PCT/US2018/031963, filed on May 10, 2018, which is a continuation of application No. 15/595,085, filed on May 15, 2017, now Pat. No. 11,157,824, which is a continuation-in-part of application No. 15/169,795, filed on Jun. 1, 2016, now abandoned, which is a continuation of application No. 14/918,626, filed on Oct. 21, 2015, now abandoned.

(51) Int. Cl.
*G06N 7/01*     (2023.01)
*G06F 16/00*    (2019.01)
*G06F 16/2457*  (2019.01)
*G06Q 50/00*    (2024.01)
*H04L 41/0893*  (2022.01)
*H04L 67/50*    (2022.01)

(52) U.S. Cl.
CPC ............... *G06N 7/01* (2023.01); *G06F 16/00* (2019.01); *G06F 16/2457* (2019.01); *G06Q 50/01* (2013.01); *H04L 41/0893* (2013.01); *H04L 67/535* (2022.05)

(58) Field of Classification Search
CPC ........................... G06F 16/2457; G06Q 50/01
See application file for complete search history.

(56) References Cited

U.S. PATENT DOCUMENTS

| | | |
|---|---|---|
| 8,442,978 B2 | 5/2013 | Berkhim et al. |
| 8,473,437 B2 | 6/2013 | Zaman et al. |
| 11,436,513 B2 * | 9/2022 | Allen ..................... G06Q 50/01 |
| 2010/0217720 A1 | 8/2010 | Jones et al. |

(Continued)

OTHER PUBLICATIONS http://leadshift.com, Identify Prospects. Book More Meetings., downloaded from the Internet May 10, 2017 (4 Pages).

(Continued)

*Primary Examiner* — Jay A Morrison
(74) *Attorney, Agent, or Firm* — Maginot, Moore & Beck LLP

(57) ABSTRACT

This disclosure discloses a network-based computing technology to evaluate relationships between social networking profiles and then to take an action based on such evaluation. This network-based computing technology may include a running logic, whether hardware or software, such as an engine, which may be modularized, that is programmed to score the relationships based on shared content.

29 Claims, 6 Drawing Sheets

(56) References Cited

U.S. PATENT DOCUMENTS

| | | |
|---|---|---|
| 2011/0258256 A1 | 10/2011 | Huberman et al. |
| 2012/0011201 A1 | 1/2012 | Yin et al. |
| 2014/0210702 A1 | 7/2014 | Peterson et al. |
| 2014/0214941 A1 | 7/2014 | Shapero et al. |
| 2014/0250048 A1 | 9/2014 | Lospinoso et al. |
| 2014/0280610 A1 | 9/2014 | Chen et al. |
| 2015/0019483 A1 | 1/2015 | Tseng |
| 2015/0039596 A1 | 2/2015 | Stewart |
| 2015/0106164 A1 | 4/2015 | Thibeault et al. |

OTHER PUBLICATIONS http://www.needtagger.com, The Customer Search Engine for Social Media, downloaded from the Internet May 10, 2017 (3 Pages).

http://www.socedo.com, B2B Intent Data from the Social Web, downloaded from the Internet May 10, 2017 (3 Pages).

Aral, Sinan. "Commentary-Identifying social influence: A comment on opinion leadership and social contagion in new product diffusion." Marketing Science 30.2 (2011): 217-223.

Bhatt, Rushi, Vineet Chaoji, and Rajesh Parekh. "Predicting product adoption in large-scale social networks." Proceedings of the 19th ACM international conference on Information and knowledge management. 2010.

Centola, Damon. "The spread of behavior in an online social network experiment." science 329.5996 (2010): 1194-1197.

Goel, Sharad, and Daniel G. Goldstein. "Predicting individual behavior with social networks." Marketing Science 33.1 (2014): 82-93.

Hill, Shawndra, Foster Provost, and Chris Volinsky. "Network-based marketing: Identifying likely adopters via consumer networks." Statistical Science 21.2 (2006): 256-276.

Hu, Yuheng, Shelly Farnham, and Kartik Talamadupula. "Predicting user engagement on twitter with real-world events." Proceedings of the International AAAI Conference on Web and Social Media. vol. 9. No. 1. 2015.

Nguyen, Tommy H., and Boleslaw K. Szymanski. "Social ranking techniques for the web." Proceedings of the 2013 IEEE/ACM International Conference on Advances in Social Networks Analysis and Mining. 2013.

Korshunov, Anton, et al. "Social network analysis: methods and applications." Proceedings of the Institute for System Programming of the RAS (Proceedings of ISP RAS) 26.1 (2014): 439-456.

International Search Report and Written Opinion dated Oct. 18, 2018 from corresponding Application No. PCT/US18/31963, 7 pages.

Yashnikov et al., Identification of Opinion Leaders of the Social Network, Youth Science Forum: Technical and Mathematical Sciences, 2016, vol. 5, No. 34, pp. 59-65.

\* cited by examiner

TECHNOLOGIES FOR EVALUATING RELATIONSHIPS BETWEEN SOCIAL NETWORKING PROFILES

CROSS-REFERENCE TO RELATED APPLICATIONS

This patent application is a Continuation of U.S. patent application Ser. No. 16/668,668 filed Oct. 30, 2019, which is a of Continuation of International Patent Application PCT/US18/31963 filed 10 May 2018, which is a Continuation of U.S. patent application Ser. No. 15/595,085 filed 15 May 2017, which is a Continuation in Part of U.S. patent application Ser. No. 15/169,795 filed Jun. 1, 2016, which is a Continuation of U.S. patent application Ser. No. 14/918,626 filed Oct. 21, 2015, each of which are herein incorporated by reference for all purposes.

TECHNICAL FIELD

Generally, this disclosure relates to social networking services. More particularly, this disclosure relates to evaluation of relationships between social networking profiles.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

Social networking services provide an opportunity to contact individuals or businesses in a quick and easy manner with minimum investment other than a computing device and a network connection. As such, over past several years, the social networking services have changed from a fad used by a small number of technology-savvy individuals to some of most heavily used websites/apps, with hundreds of millions of subscribers. For example, Facebook, which is one of most popular social networking services, has become one of most frequented websites/apps globally.

There are several technical problems with the social networking services. In particular, as end users upload various posts to the social networking services, there is no technique or analytics available to a 3rd party to determine effectively how information flows among the end users within the social networking services, whether within a single social networking service or among a plurality of social networking services. For example, for a given social networking service, the 3rd party is not able to determine effectively how a post associated with a first social networking profile is propagated in that social networking service to be seen eventually via a second social networking profile when the first social networking profile is not connected to the second social networking profile directly.

SUMMARY

This disclosure addresses at least one of above inefficiencies at least partially. However, this disclosure can prove useful to other technical areas. Therefore, various claims recited below should not be construed as necessarily limited to addressing any of the above inefficiencies.

In an embodiment, there is provided a method comprising: serving, via a server, over a wide area network, to a browser running on an operating system of a client, a page depicting a plurality of alphanumeric input fields and a numeric input field; receiving, via the server, over the wide area network, from the client, a plurality of social networking service profile identifiers input into the alphanumeric input fields on the browser and a time unit value input into the numeric input field on the browser; writing, via the server, the social networking service profile identifiers and the time unit value into a data structure in accordance with a schema of the data structure; querying, via the server, over the wide area network, a social networking service periodically based on the social networking service profile identifiers sourced from the data structure and according to the time unit value sourced from the data structure such that a plurality of status updates of a plurality of social networking profiles corresponding to the social networking service profile identifiers can be read via the server, wherein the social networking profiles are not connected directly; copying, via the server, over the wide area network, the status updates; writing, via the server, the status updates into the data structure in accordance with the schema such that the status updates correspond to the social networking service profile identifiers stored in the data structure; retrieving, via the server, the status updates and the social networking service profile identifiers from the data structure; inputting, via the server, the status updates and the social networking service profile identifiers into a running logic; generating, via the server, a value based on the running logic evaluating the status updates and the social networking service profile identifiers; evaluating, via the server, the value against a threshold; and taking, via the server, a first action based on the value satisfying the threshold and a second action based on the value not satisfying the threshold.

This disclosure is embodied in various forms illustrated in a set of accompanying illustrative drawings. Note that variations are contemplated as being a part of this disclosure, limited only by a scope of various claims recited below.

DESCRIPTION OF DRAWINGS

The set of accompanying illustrative drawings shows various embodiments of this disclosure. Such drawings are not to be construed as necessarily limiting this disclosure. Like numbers and/or similar numbering scheme can refer to like and/or similar elements throughout.

DETAILED DESCRIPTION OF PREFERRED EMBODIMENTS

Figure 1:
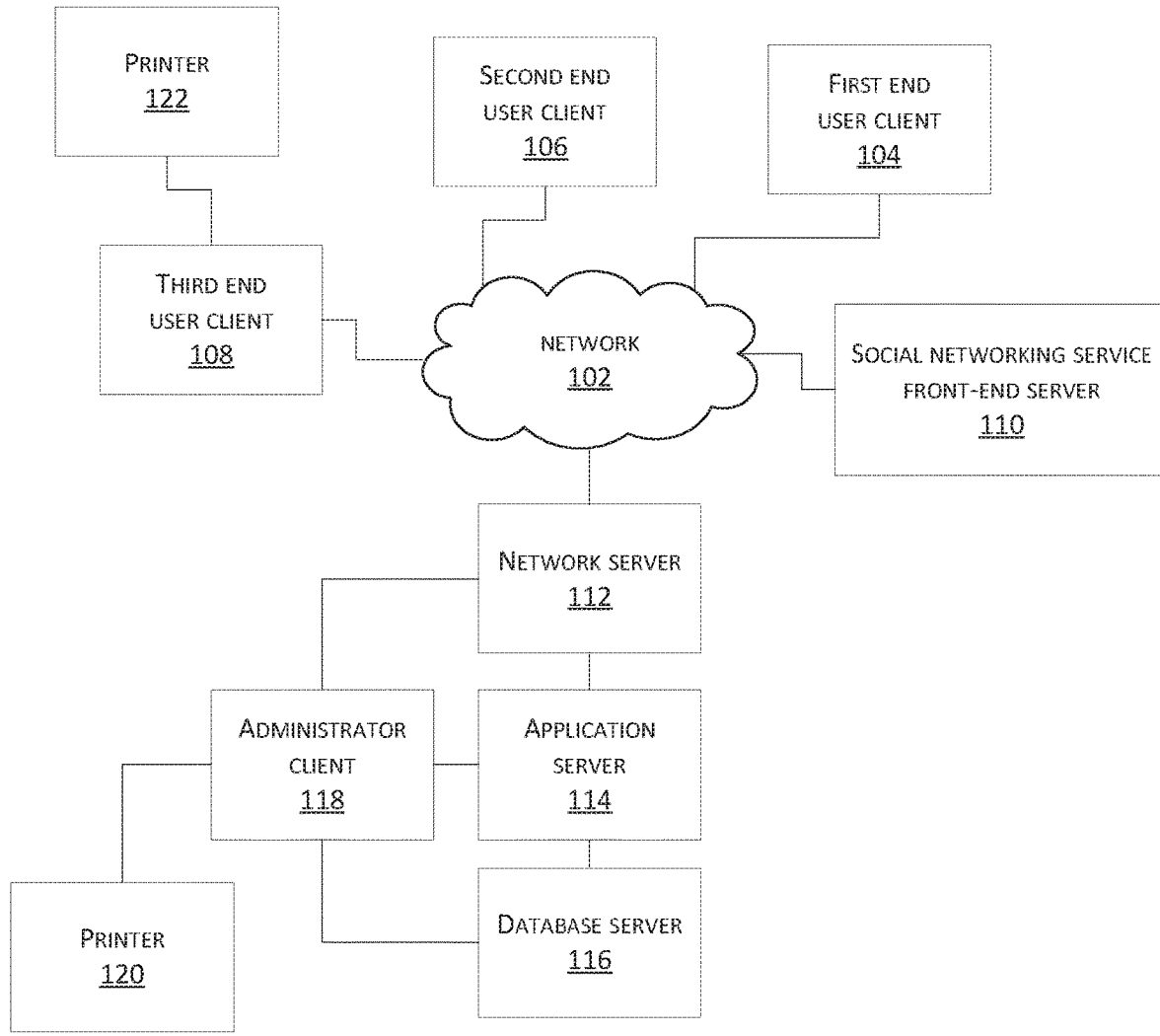
FIG. 1 shows a schema of an embodiment of a network topology according to this disclosure.

This disclosure is now described more fully with reference to the set of accompanying drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Generally, this disclosure discloses a network-based computing technology to evaluate relationships between social networking profiles and then to take an action based on such evaluation. This network-based computing technology may include a running logic, whether hardware or software, such as an engine, which may be modularized, that is programmed to score the relationships based on shared content, not necessarily based on connections, although this is possible, whether alternatively or additionally. For example, for a plurality of social networking service profiles, commonly shared content may be weighed higher than uncommonly shared content, which may indicate a high probability of a particular information path or that the commonly shared content was obtained from a common data source, such as a website. This network-based computing technology can be implemented via a plurality of computers (servers/clients) utilizing a plurality of data structures/messages. Such implementation includes data structure/message generation, storage, retrieval, population, copying, moving, editing, modifying, sorting, searching, sending, receiving, updating, deleting, encrypting, decrypting, de-duplicating, converting, or any other local or network-based data structure/message operation associated with a structure/message (data shell) or the data itself (content). For example, the structure/message (shell) can comprise a file, a table, an array, a matrix, a linked list, a tree, a string, a quad tree, a hash, or any other structures of data. The data (content) can contain any alphanumeric, image, acoustic, binary, or any other content.

Aspects of this disclosure are described with reference to flowchart illustrations and/or block diagrams of methods, apparatus (systems), and computer program products according to embodiments of the disclosure. Each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams as included herewith illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain embodiments may be combined and sub-combined in and/or with various other embodiments. Also, different aspects and/or elements of embodiments, as disclosed herein, may be combined and sub-combined in a similar manner as well. Further, some embodiments, whether individually and/or collectively, may be components of a larger system, wherein other procedures may take precedence over and/or otherwise modify their application. Additionally, a number of steps may be required before, after, and/or concurrently with embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a schema of an embodiment of a network topology according to this disclosure. In particular, a network topology 100 contains a network 102, a first end user client 104, a second end user client 106, a third end user client 108, a social networking service front-end server 110, a network server 112, an application server 114, a database server 116, an administrator client 118, a printer 120, and a printer 122.

The topology 100 is based on a distributed network operation model, which allocates tasks/workloads between servers, which provide a resource/service, and clients, which request the resource/service. Although the servers and the clients illustrate different computers/applications, in some embodiments, the servers and the clients reside in or share or are one system/application. Further, the topology 100 entails allocating a large number of resources to a small number of servers, where complexity of the clients, depends on how much computation is offloaded to the small number of servers, i.e., more computation offloaded from the clients onto the servers leads to lighter clients, such as being more reliant on network sources and less reliant on local computing resources. However, note that other computing models are possible as well. For example, such models can comprise decentralized computing, such as peer-to-peer (P2P), for instance Bit-Torrent, or distributed computing, such as via a computer cluster where a set of networked computers works together such that the computer can be viewed as a single system.

Each component of the topology 100 can be implemented in a logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component.

The network 102 includes a plurality of nodes that allow for sharing of resources or information. The network 102 can be wired, waveguide, wireless, or others. For example, the network 102 can be a local area network (LAN), a wide area network (WAN), a cellular network, a satellite network, a personal area network (PAN), a fiber optic network, or others. For example, the network 102 can be embodied via a plurality of radio signals, a plurality of light signals, a plurality of sound signals, a plurality of infrared signals, or others. For example, the network 102 can be based on Wi-Fi or Li-Fi technology.

The client 104 includes a desktop, a laptop, a tablet, a smartphone, a workstation, a terminal, or any other end user device. In particular, the client 104 includes a multicore processor, a memory in communication with the processor, and a transceiver in communication with the processor. The memory stores an operating system (OS), such as MacOS, Windows, UNIX, Linux, or others, that runs on the multicore processor. The transceiver, such as a transmitter and a receiver, communicates with the network 102, whether in a wired, waveguide, or wireless manner, whether direct or indirect, as managed via the OS.

The client 106 includes a desktop, a laptop, a tablet, a smartphone, a workstation, a terminal, or any other end user device. In particular, the client 106 includes a multicore processor, a memory in communication with the processor, and a transceiver in communication with the processor. The memory stores an OS, such as MacOS, Windows, UNIX, Linux, or others, that runs on the multicore processor. The transceiver, such as a transmitter and a receiver, communicates with the network 102, whether in a wired, waveguide, or wireless manner, whether direct or indirect, as managed via the OS. The client 106 may be operated via a same or different operator as the client 104 and may be located in a same or different location as the client 104. The client 106 may be same or different as the client 104 in type, structure, or function.

The client 108 includes a desktop, a laptop, a tablet, a smartphone, a workstation, a terminal, or any other end user device. In particular, the client 108 includes a multicore processor, a memory in communication with the processor, and a transceiver in communication with the processor. The memory stores an OS, such as MacOS, Windows, UNIX, Linux, or others, that runs on the multicore processor. The transceiver, such as a transmitter and a receiver, communicates with the network 102, whether in a wired, waveguide, or wireless manner, whether direct or indirect, as managed via the OS. The client 108 may be operated via a same or different operator as the client 104 or the client 106 and may be located in a same or different location as the client 104 or the client 106. The client 108 may be same or different as the client 104 or the client 106 in type, structure, or function.

The server 110 includes a multicore processor, a memory in communication with the processor, and a network card in communication with the processor. The memory stores an OS, such as MacOS, Windows, UNIX, Linux, or others, that runs on the multicore processor. The network card communicates with the network 102, whether direct or indirect, as managed via the OS. The server 110 hosts a front-end application running on the OS. The front-end application enables the client 104 to access a social networking service via a first login over the network 102 based on a first end user social networking profile and the client 106 to access the social networking service via a second login over the network 102 based on a second end user social networking profile. In response, the front-end application presents a first social networking wall, such as on a webpage, associated with the first end user social networking profile to the client 104 and a second social networking wall, such as on a webpage, associated with the second end user social networking profile to the client 106.

The front-end application interfaces with a computing infrastructure of the social networking service, such a middle-tier application and a back-end application, to present the first end user social networking profile and the second end user social networking profile. Note that the server 110 may be included in a cluster of servers, such as a front-end cluster, which may include a plurality of servers, such as hundreds, thousands, or more. In such configurations, the front-end cluster may include a plurality of web servers that may represent a majority the front-end cluster and that may run a plurality of virtual machines for just-in-time compilation and that may execute programs written in various languages, such as Hack, PHP, or others.

Note that the server 110 may perform or receive a large volume of data requests. As such, there server 110 employs the multicore processor, which comprises a plurality of independent cores. For example, the multicore processor is a computing component with two or more independent processing units, which are the units that read and execute program instructions, such as the front-end application, such as via multiprocessing or multithreading. The instructions are processing instructions, such as add, move data, or branch, but the cores can run multiple instructions concurrently, thereby increasing an overall operational speed for the front-end application, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as very long instruction word (VLIW), superscalar, vector, or multithreading.

The server 112 includes a multicore processor, a memory in communication with the processor, and a network card in communication with the processor. The memory stores an OS, such as MacOS, Windows, UNIX, Linux, or others, that runs on the multicore processor. The network card communicates with the network 102, whether direct or indirect, as managed via the OS. The server 112 is programmed to act as instructed via the server 114 based on the server 112 interfacing with the server 114, whether directly or indirectly. For example, the server 112 can serve a graphical user interface (GUI) page, such as via a webpage through a Hypertext Transfer Protocol (HTTP) whether the page is static or dynamically generated, to the client 108, receive a request from the client 108, pass the request to the server 114, read the first end user social networking profile and the second end user social networking profile on the server 110, and others. For example, the servers 112 is a web server, such as Apache, Microsoft's Internet Information Server (IIS), Novell's NetWare server, Google Web Server (GWS), IBM Domino server, or others.

Note that the server 112 may perform or receive a large volume of data requests. As such, there server 112 employs the multicore processor, which comprises a plurality of independent cores. For example, the multicore processor is a computing component with two or more independent processing units, which are the units that read and execute program instructions, such as the front-end application, such as via multiprocessing or multithreading. The instructions are processing instructions, such as add, move data, or branch, but the cores can run multiple instructions concurrently, thereby increasing an overall operational speed for the front-end application, which is amenable to parallel computing. The cores can process in parallel when concurrently accessing a file or any other data structure, as disclosed herein, while being compliant with ACID principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as VLIW, superscalar, vector, or multithreading.

The server 114 includes a multicore processor, a memory in communication with the processor, and a network card in communication with the processor. The memory stores an OS, such as MacOS, Windows, UNIX, Linux, or others, that runs on the multicore processor. The network card communicates with the network 102, whether direct or indirect, as managed via the OS. The server 114 hosts a software application and a set of logic for the software application, such as a set of rules, a formula, or others. Therefore, as instructed by the software application, the server 114 interfaces with the server 112 and the server 116. For example, the server 114 can act as a middle-tier server, with the servers 112 acting as a front-tier server, and the servers 116 acting as a back-end server. For example, the servers 114 be an IBM WebSphere application server, a SAP Web application server, or others.

Note that the server 114 may perform or receive a large volume of data requests. As such, there server 114 employs the multicore processor, which comprises a plurality of independent cores. For example, the multicore processor is a computing component with two or more independent processing units, which are the units that read and execute program instructions, such as the front-end application, such as via multiprocessing or multithreading. The instructions are processing instructions, such as add, move data, or branch, but the cores can run multiple instructions concurrently, thereby increasing an overall operational speed for the front-end application, which is amenable to parallel computing. The cores can process in parallel when concurrently accessing a file or any other data structure, as disclosed herein, while being compliant with ACID principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as VLIW, superscalar, vector, or multithreading.

The server 116 includes a multicore processor, a memory in communication with the processor, and a network card in communication with the processor. The memory stores an OS, such as MacOS, Windows, UNIX, Linux, or others, that runs on the multicore processor. The network card communicates with the network 102, whether direct or indirect, as managed via the OS. The server 116 hosts a database, such as a relational database, a NoSQL, an in-memory database, or others. The database stores data, whether in a raw state, a formatted state, an organized stated, or any other accessible state, and allows access to such data, whether directly and/or indirectly. As such, the server 116 is configured for various database input and output operations, including reading, writing, copying, editing, deleting, updating, searching, selecting, merging, sorting, erasing, formatting, or others. For example, the server 116 can implement record locking on the database.

Note that the server 116 may perform or receive a large volume of data requests. As such, there server 116 employs the multicore processor, which comprises a plurality of independent cores. For example, the multicore processor is a computing component with two or more independent processing units, which are the units that read and execute program instructions, such as the front-end application, such as via multiprocessing or multithreading. The instructions are processing instructions, such as add, move data, or branch, but the cores can run multiple instructions concurrently, thereby increasing an overall operational speed for the front-end application, which is amenable to parallel computing. The cores can process in parallel when concurrently accessing a file or any other data structure, as disclosed herein, while being compliant with ACID principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as VLIW, superscalar, vector, or multithreading.

Note that the server 112, the server 114, and the server 116 may define a system that is programmed to evaluate relationships between social networking profiles and then to take an action based on such evaluation. As such, such system is managed via the client 118 based on the client 118 communicating with the server 112, the server 114, and the server 116, whether directly or indirectly.

The client 118 includes a desktop, a laptop, a tablet, a smartphone, a workstation, a terminal, or any other end user device. In particular, the client 118 includes a multicore processor, a memory in communication with the processor, and a transceiver in communication with the processor. The memory stores an OS, such as MacOS, Windows, UNIX, Linux, or others, that runs on the multicore processor. The transceiver, such as a transmitter and a receiver, communicates with the network 102, whether in a wired, waveguide, or wireless manner, whether direct or indirect, as managed via the OS. The client 118 administers the system including the server 112, the server 114, and the server 116, such as via having access to tweak settings of any component of the system, having access to update any component of the system, having access to troubleshoot any component of the system, having access to debug any component of the system, or others. The client 118 may be operated via a same or different operator as the client 104 or the client 106 or the client 108 and may be located in a same or different location as the client 104 or the client 106 or the client 108. The client 118 may be same or different as the client 104 or the client 106 or the client 106 in type, structure, or function.

The printer 120 includes a processor, a memory in communication with the processor, a transceiver in communication with the processor, and a print head in communication with the processor. The printer 120 is in communication with the client 118 via the transceiver. The print head can print in black/white, grayscale, or monochrome. For example, the print head can print a report on a tangible medium, such as paper, rubber, metal, plastic, or others, with the report being sourced from the system managed via the client 118. The printer 120 can be stationary or mobile. The printer 120 can be a component of a multi-function device.

The printer 122 includes a processor, a memory in communication with the processor, a transceiver in communication with the processor, and a print head in communication with the processor. The printer 122 is in communication with the client 108 via the transceiver. The print head can print in black/white, grayscale, or monochrome. For example, the print head can print a report on a tangible medium, such as paper, rubber, metal, plastic, or others, with the report being sourced from the client 108 communicating with the server 112 over the network 102. The printer 122 can be stationary or mobile. The printer 122 can be a component of a multi-function device. Note that the printer 120 and the printer 122 can be similar to or different from each other in any aspect, such as structure.

In one mode of operation, in response to a request submitted on a browser running on the OS of the client 108, the server 112 serves, over the network 102, to the browser, a webpage depicting a plurality of alphanumeric input fields and a numeric input field. Subsequently, the server 112 receives, over the network 102, from the client 108, a plurality of social networking service profile identifiers input into the alphanumeric input fields on the browser and a time unit value input into the numeric input field on the browser. The social networking service profile identifiers are associated with a social networking service availed via the server 110. The server 112 writes, via the server 114, the social networking service profile identifiers and the time unit value into a data structure, such as the database hosted on the server 116, in accordance with a schema of the data structure. For example, the database can include an in-memory database, a NoSQL database, or others. The server 112, as instructed via the server 114, queries, over the network 102, the social networking service, such as the server 110, periodically based on the social networking service profile identifiers sourced from the data structure and according to the time unit value sourced from the data structure such that a plurality of status updates of a plurality of social networking profiles corresponding to the social networking service profile identifiers can be read via the server 112, with the social networking profiles not being connected directly to each other. The server 112 copies, over the network 102, the status updates and writes, via the server 114, the status updates into the data structure in accordance with the schema such that the status updates correspond, such as logically, to the social networking service profile identifiers stored in the data structure. Note that the server 112 or the server 114 or the server 116 can disambiguate the status updates before writing the status updates into the data structure. The server 114 retrieves the status updates and the social networking service profile identifiers from the data structure and inputs the status updates and the social networking service profile identifiers into a running logic, such as an engine, a module, an application, or others, whether local to or remote from the server 114. The server 114 generates a value based on the running logic evaluating the status updates and the social networking service profile identifiers, evaluates the value against a threshold, whether local to or remote from the server 114, and takes a first action based on the value satisfying the threshold and a second action based on the value not satisfying the threshold. For example, the server 112 or the server 114 may host a bot performing at least one of the querying, the copying, the writing, the inputting, the generating, the evaluating, or the taking, as noted above. For example, if the page is a first page, then the first action can include the server 112 serving, over the network 102, a second page to the browser, where the second page depicts the value. For example, the first action can include the server 112 updating, over the network 102, the page such that the page depicts the value. For example, the server 112 can query the server 110 in parallel with respect to the social networking profiles, where the status updates are read in parallel or where the server 112 runs a plurality of threads corresponding to the social networking service profile identifiers, with the querying is via the threads, or the server 112 includes a plurality of processing cores, where the querying is via the cores. For example, the server 112 can query the server 110 serially with respect to the social networking profiles, where the status updates are read serially or where the server 112 runs a plurality of threads corresponding to the social networking service profile identifiers, where the querying is via the threads or where the server 112 includes a plurality of processing cores, where the querying is via the cores. For example, the first action can include the server 112 or the server 114 inputting the value into an analytic process local to or remote from the server 112 or the server 114. For example, the running logic can include a formula, where the value can be generated based on the formula, the running logic can include an engine running on the OS of the server 114, where the engine hosts the formula, which may employ a Random Surfer model, where the formula can include $$Score_n = \left(\frac{1-\delta}{D_1^T + D_2^T + \ldots + D_n^T}\right) + \delta\left\{\left(\frac{D_1^C}{D_1^T} + \frac{D_2^C}{D_2^T} + \ldots + \frac{D_n^C}{D_n^T}\right) + \left(\frac{Score_{n-1}}{D_1^T + D_2^T + \ldots + D_n^T}\right)\right\}, 0 \leq n \leq \infty,$$

where
$D_n^C$=peice of data from profile n
$D_n^T$=total data from profile n
$\delta$=unspecified coefficient for imconsistencies
$Score_{n-1}$=previous score
$Score_n$=new score Note that $\delta$ may correspond to a value, such as a decimal value between 0 and 1, although other ranges are possible, whether higher or lower. For example, the value may be a value from about 0 to about 1, inclusively, such as 0.85. The coefficient for inconsistencies, $\delta$, is included to prevent profiles with no relatability from "absorbing" the value of other profiles that are connected thereto. For example, one profile that "follows" nobody on a social networking service could still be "followed" by others. Therefore, information could get "trapped" in a profile that follows no one and theoretically could not escape. If one were to set $\delta$ to high (e.g. very close to or 1), then this process may not come to a stop, such as via an endless loop, or take a long time to complete and the scores may take a long time to converge (i.e. reach a steady state of a Markov chain representing profiles and their content). Conversely, if one were to set the $\delta$ too low (e.g. very close to or 0), then the scores may be erratic, both above and below the average, and may not converge or converge after a long period of time. Therefore, $\delta$ can be determined as a weighted average between those two bounds or extremes. In the formula, a leftmost parenthesis is informative of a probability of no relatedness even if hyperlinks are not identical, whereas a rightmost brackets are informative of a probability of relatedness based on inputs for each profile, such as social networking posts. For example, if one were to look at all the words (e.g. natural language) used by two social media participants, then one can use those words and where they overlap as one input into this process.

For example, the first action can include the server 112, via the server 114, writing the value into the data structure such that the value corresponds to the social networking service profile identifiers in the data structure. For example, the server 114 can access the data structure stored on the server 116 such that the server 114 can write to the server 116 based on such accessing, where the server 114 is in communication with the server 116 based on a representation state transfer (REST) application programming interface (API). For example, the server 112 can access the running logic stored on the server 114, where the inputting of the value is based on such accessing, where the server 112 is in communication with the server 114 based on a REST API. Note that the server 114 can be situated within a server cluster logically, where the server 112 is external to the cluster, and where the cluster is run asynchronously. For example, the second action can include repeating the generating of the value iteratively until the value satisfies the threshold such that the first action can be performed. For example, the first action can include the server 114 caching the value based on a set of criteria such that the server 112 outputs the value, as cached, when requested via the client 108 over the network 102 and when the value satisfies the set of criteria at a time when the request is received via the server 112 over the network 102 from the client 108. For example, at least two of the server 112, the server 114, or the server 116 can be situated with a virtual private cloud (VPC) logically.

Figure 2:
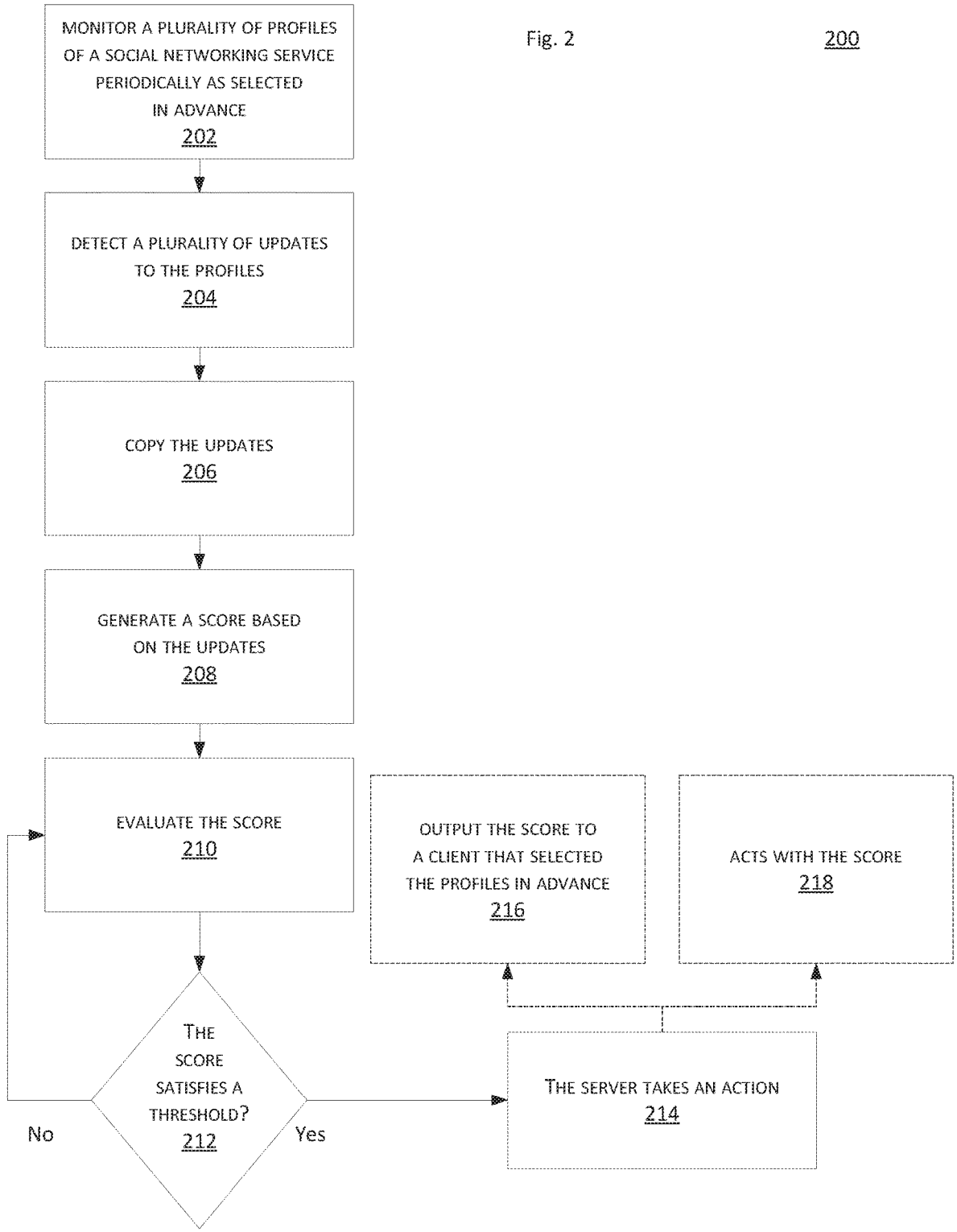
FIG. 2 shows a flowchart of an embodiment of a method of score formation according to this disclosure.

FIG. 2 shows a flowchart of an embodiment of a method of score formation according to this disclosure. In particular, a method 200 includes a plurality of blocks 202-218. For example, the method 200 can be performed via the topology 100 or others, as disclosed herein.

In a block 202, a server monitors a plurality of social networking profiles of a social networking service periodically as selected in advance. In particular, the server serves a GUI, such as a web page depicting a tabular form with a submit button, to a client for an input of a plurality of social networking service profile identifiers, which are alphanumeric, and a time unit value, which is numeric. For example, the social networking service profile identifiers can be "John Smith" or "JSmith7580" or "joNny1_2" or "SUPERMAN!" or any other alphanumeric string in any language, such as English, Russian, Arabic, Hebrew, Mandarin, Hindi, Dutch, Spanish, Portuguese, or others. In some embodiments, the alphanumeric fields can be programmed to transliterate between languages on input or upon activation or upon request, such as an input "Ivan" into a text field can be transliterated into "Иван" in that text field, as language-selection prompted on the tabular form. For example, such transliteration can be based on a language selection menu presented on the tabular form or overlaid over the tabular form via the server or the client and then the server or the client querying a local or a remote data source, such as Google Translate or a transliteration engine, such as www.Translit.ru. Similarly, the time unit value may be any number of seconds, minutes, hours, days, weeks, or specific times/dates/time zones, or others, inclusively, whether less or more, such as 10 seconds or 3.3 hours, or every 4 hours or 6 hours or at 10:23 pm EST on Nov. 18, 2023 or 31/1/2025 @ 16:03 CST or others.

In some embodiments, the GUI can request an input of a social networking service identifier, such as Facebook, Twitter, LinkedIn, or others. In some embodiments, the GUI is programmed to validate a social networking service profile identifier, such as via the server or the client querying a social networking service based on a social networking service identifier and reading a social networking service profile based on the social networking service identifier, otherwise if such reading is not possible, then the GUI can output a prompt that the social networking service profile identifier is not valid or that the social networking service is not responsive to the querying. In some embodiments, the GUI can parse a social networking service profile identifier based on a set of rules programmed into the GUI, such as via a script, such as JavaScript or others, and determine what social networking service the social networking service profile identifier is valid in, such as when the social networking services enforce different handles or profile names. For example, such parsing can employ a natural language processing (NLP) technique or scan for flags or keywords within the social networking service profile identifier and then respond, such as via pulling a reply, with a matching keyword or a similar wording pattern from a database, which may be stored locally or remotely. For example, the NLP technique can include lemmatization, morphological segmentation, stemming, lexical semantics, machine translation, sentiment analysis, relationship extraction, topic segmentation, word sense disambiguation, summarization, conference resolution, discourse analysis, or others. When the social networking service profile identifier is valid in multiple social networking services, such as being identical in Facebook and Twitter, then the GUI can be programmed to output a list of such social networking service identifiers, which may include best matches of social networking services to the social networking service profile identifier, such as Facebook and Twitter, and then receive an input via the GUI, where the input selects a social networking service identifier from the list of social networking service identifiers. In some embodiments, such input can select at least two of the social networking service identifiers, such as both Facebook and Twitter. In some embodiments, the social networking service profile identifiers can include a plurality of hyperlinks to a plurality of social networking service webpages depicting the social networking service profiles, whether the social networking service profile identifiers are or are not included in the hyperlinks.

When the client uploads the social networking service profile identifiers, which are alphanumeric, and the time unit value, which is alphanumeric, to the server, such as based on an operator of the client activating the button on the tabular form, the server may validate and, if validation passes, store, such as based on writing, the social networking profile identifiers in a data structure, such as an array, a table, or others. For example, the data structure can include a database, which may be a distributed or a graphical database. For example, the social networking service profile identifiers may be stored in accordance with a data schema of the data structure. The server may write the time value unit into the data structure in accordance with the data schema or the time value unit may be stored external to the data structure, yet logically associated therewith. Once the social networking service profile identifiers and the time value unit are stored in accordance with the schema, the server begins to monitor the social networking service profiles in a social networking service based on the time unit value. For example, the monitoring can include reading the social networking service webpages depicting the social networking profiles, when the social networking service webpages are publicly readable, in whole or in part. However, when such social networking service webpages are not publicly readable, then the server can prompt an error message informative of such or request login information for those social networking service webpages. In some embodiments, the server deploys a bot to monitor the social networking service webpages or a social networking service data feed.

The server monitors the social networking service profiles based on the social networking service profile identifiers, whether the social networking service has been identified previously via the operator of the client, such as via the tabular form, or the server determining a social networking service that is applicable to the social networking service profile identifiers, such as based on parsing the social networking service profile identifiers linguistically based on a set of rules, comparing the social networking service profile identifiers as parsed against a set of social networking service allowable identifiers, and identifying the social networking service that best or strictly matches the social networking service profile identifiers based on such comparing. For example, such parsing can employ an NLP technique or scan for flags or keywords within the social networking service profile identifier and then respond, such as via pulling a reply, with a matching keyword or a similar wording pattern from a database, which may be stored locally or remotely. For example, the NLP technique can include lemmatization, morphological segmentation, stemming, lexical semantics, machine translation, sentiment analysis, relationship extraction, topic segmentation, word sense disambiguation, summarization, conference resolution, discourse analysis, or others.

The server monitors the social networking service profiles based on the social networking service profile identifiers via querying the social networking service based on the social networking service profile identifiers and reading the social networking service profiles. The reading can be a specific area on the profile, such as a specific profile field or a profile keyword, or the profile in full. For example, the reading can include reading a status field of a social networking service profile. Note that the reading can include alphanumeric reading, barcode reading, image reading, sound reading, document reading, or any other type of reading. For example, for image reading, the server may employ image processing algorithms, such as pre-processing, character recognition, object recognition, post-processing, and others. Note that the social networking profiles can be within a single social networking service or in different social networking services. For example, the social networking profile can be within Facebook or some within Facebook and some within Twitter.

In a block 204, the server detects a plurality of updates to the social networking service profiles, such as over the social networking service webpages depicting the social networking service profiles. The server detects the updates based on querying the social networking service periodically based on the time value unit, such as every 15 minutes. The detecting can include initially querying the social networking service based on the social networking service profile identifiers to obtain a plurality of first updates from the social networking profiles depicted on the social networking service webpages, waiting for a time period corresponding to the time value unit, again querying the social networking service based on the social networking service profile identifiers to obtain a plurality of second updates from the social networking profiles depicted on the social networking service webpages, comparing the first updates to the second updates, and identifying a plurality of updates, such as changes, between the first updates and the second updates.

In a block 206, the server copies the updates as detected. The server writes the updates into the data structure in accordance with the data schema thereof. The data structure stores the updates such that the updates correspond to the social networking service profile identifiers, such as in a one-to-one manner.

In a block 208, the server generates a score based on the updates. In particular, the server runs an engine that accesses the data structure, such as to reading the data structure, although other access rights are possible, such as write or delete. The engine may be a dedicated computer program or a part of a computer program, that may serve as a core foundation for a larger piece of software. The engine may exclude a GUI generation functionality. The engine may be a component of an OS. The engine may be a type of software that generates source code or markup and produces outputs that begin another process, allowing real-time maintenance of software requirements. For example, the engine may be a self-actualizing element of a complete process and is, therefore, a driving motive behind an original process. For example, the engine may be software that facilitates automated processes, in which different software elements work interactively to minimize human intervention. The engine may produce code that is concurrently executed by its originally invoked process. The process is entirely automatic and may be unmanaged by daemons or dynamic database triggers. The engine may be a component of an artificial intelligence application, whether local to or remote from the engine. The engine may be distributed among a plurality of servers. The engine stores or accesses a formula and applies the formula to the updates. For example, the formula may employ a Random Surfer model and can include $$Score_n = \left(\frac{1-\delta}{D_1^T + D_2^T + \ldots + D_n^T}\right) + \delta\left\{\left(\frac{D_1^C}{D_1^T} + \frac{D_2^C}{D_2^T} + \ldots + \frac{D_n^C}{D_n^T}\right) + \left(\frac{Score_{n-1}}{D_1^T + D_2^T + \ldots + D_n^T}\right)\right\}, 0 \le n \le \infty,$$

where
$D_n^C$=peice of data from profile n
$D_n^T$=total data from profile n
$\delta$=unspecified coefficient for imconsistencies
$Score_{n-1}$=previous score
$Score_n$=new score Note that $\delta$ may correspond to a value, such as a decimal value between 0 and 1, although other ranges are possible, whether higher or lower. For example, the value may be a value from about 0 to about 1, inclusively, such as 0.85. The coefficient for inconsistencies, $\delta$, is included to prevent profiles with no relatability from "absorbing" the value of other profiles that are connected thereto. For example, one profile that "follows" nobody on a social networking service could still be "followed" by others. Therefore, information could get "trapped" in a profile that follows no one and theoretically could not escape. If one were to set $\delta$ to high (e.g. very close to or 1), then this process may not come to a stop, such as via an endless loop, or take a long time to complete and the scores may take a long time to converge (i.e. reach a steady state of a Markov chain representing profiles and their content). Conversely, if one were to set the $\delta$ too low (e.g. very close to or 0), then the scores may be erratic, both above and below the average, and may not converge or converge after a long period of time. Therefore, $\delta$ can be determined as a weighted average between those two bounds or extremes. In the formula, a leftmost parenthesis is informative of a probability of no relatedness even if hyperlinks are not identical, whereas a rightmost brackets are informative of a probability of relatedness based on inputs for each profile, such as social networking posts. For example, if one were to look at all the words (e.g. natural language) used by two social media participants, then one can use those words and where they overlap as one input into this process.

For example, the formula can be populated as $$Score_n = \left(\frac{1-.85}{400+300}\right) + .85\left\{\left(\frac{150}{400} + \frac{99}{300}\right) + \left(\frac{0}{400+300}\right)\right\},$$

and this formula would iterate, such as via a for loop or a while loop, until the values reached a steady state of the Markov chain representing profiles and their content.

As such, the engine forms a numeric score, such as between 0 and 1, inclusively. For example, the score may be 0.94, although other scoring systems are possible. For example, the score may be alphabetical, such as A, B, C, or others. The score may be informative of a relationship strength between at least two profiles, as well as a probability that information will flow from one profile to the other profile. For example, if the score is closer to a lower bound, then the score may be informative of a weaker relationship and a lower probability that information will flow from one to the other. Conversely, if the score is closer to an upper bound, then the score may be informative of a stronger relationship and a higher probability of information flowing from one to the other. In some embodiments, the score may be generated in under 5 minutes as started from when the engine has immediate and direct access to all variables/data necessary for the formula to be calculated. For example, the score may be generated under 4 minutes, 3 minutes, 2, minutes, 1 minute, under 45 seconds, under 30 seconds, under 15 seconds, under 10 seconds, under 5 seconds, under 3 seconds, or others, inclusively. Upon formation, whether immediately or on delay, the engine may output the score.

In a block 210, the server evaluates the score against a threshold, such as a previous score, such as an alphanumeric value. In particular, the server locally evaluates the score to determine whether the score is roughly equivalent to the previous score, if any. If the previous score does not exist, then the server repeats the block 210 in order to attempt to determine whether the score is roughly equivalent to the previous score. This is done in order to determine whether the algorithm has converged, and the scores have reached a steady state in the Markov chain representing the profiles and their content. Note that this may involve the server re-querying the social networking service in accordance with the time value unit based on the social networking service profile identifiers and re-detecting the updates to the social networking service profiles, as disclosed herein.

In a block 212, the server determines whether the score satisfies the threshold. If not, then the block 210 is performed. If yes, then the block 214 is performed.

In a block 214, the server takes an action. The action can be of any type, such as writing the score to a data structure or the data structure storing the social networking profile identifiers, modifying a data structure or the data structure storing the social networking profile identifiers with a datum other than the score, requesting that a logic local to or remote from the server does something, inputting the score into a logic local to or remote from the server, outputting the score to the client that initially selected the social networking service profiles to be monitored in accordance with the time value unit, requesting an input or output device, whether local to or remote from the server, such as the printer 120 or the printer 122, to do something, such as generate a report, initiates a service, whether local to or remote from the server.

In a block 216, which may be optional, the server outputs the score to the client that initially selected the social networking service profiles to be monitored in accordance with the time value unit. Such output may be via GUI, which may include generating a new page or updating a page already presented on the client.

In a block 218, which may be optional, the server acts with the score, such as writing the score to a data structure or the data structure storing the social networking profile identifiers, modifying a data structure or the data structure storing the social networking profile identifiers with a datum other than the score, requesting that a logic local to or remote from the server does something, inputting the score into a logic local to or remote from the server, requesting an input or output device, such as the printer 120 or the printer 122, whether local to or remote from the server, to do something, such as generate a report, initiates a service, whether local to or remote from the server, or others.

Figure 3:
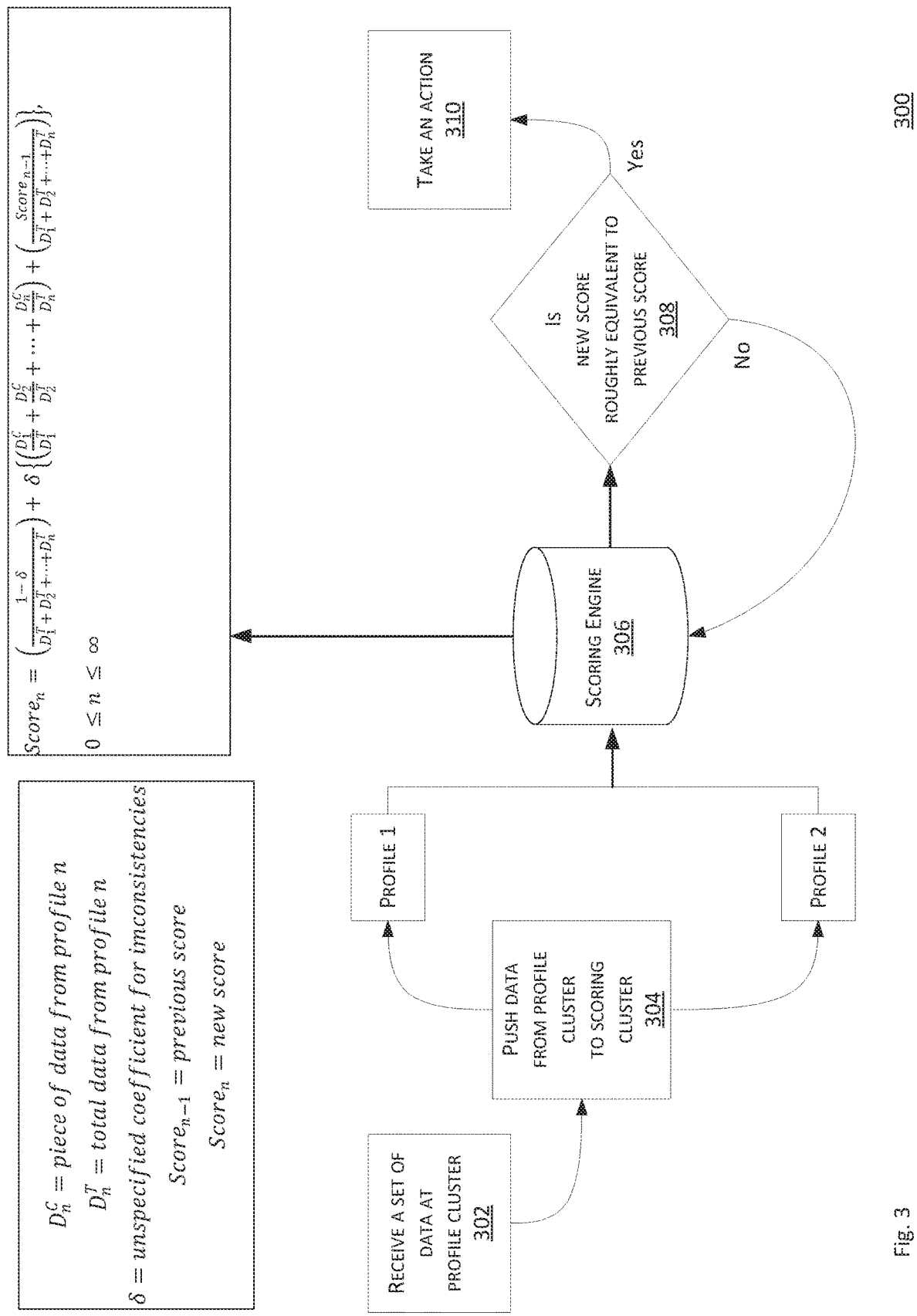
FIG. 3 shows a flowchart of an embodiment of a method of score formation via an engine based on a formula according to this disclosure.

FIG. 3 shows a flowchart of an embodiment of a method of score formation via an engine based on a formula according to this disclosure. In particular, a method 300 includes a plurality of blocks 302-310. For example, the method 300 can be performed via the topology 100 or others, as disclosed herein.

In a block 302, a server receives a set of data at a profile cluster, as disclosed herein. For example, the set of data may include the updates as read via the server from the social networking service via the social networking profile webpages accessed based on the social networking service profile identifiers.

In a block 304, the server pushes the set of data from the profile cluster to a scoring cluster. This may be done within a VPC, such as over a storage area network (SAN) fabric, such as a storage fabric, such as a Fibre Channel network or others.

In a block 306, the scoring cluster hosts an engine that receives the set of data, processes the set of data, and outputs a score, which may be alphanumeric. The engine stores or accesses a formula and applies the formula to the set of data. For example, the formula may employ a Random Surfer model and can include $$Score_n = \left(\frac{1-\delta}{D_1^T + D_2^T + \ldots + D_n^T}\right) + \delta\left\{\left(\frac{D_1^C}{D_1^T} + \frac{D_2^C}{D_2^T} + \ldots + \frac{D_n^C}{D_n^T}\right) + \left(\frac{Score_{n-1}}{D_1^T + D_2^T + \ldots + D_n^T}\right)\right\}, 0 \le n \le \infty,$$

where
$D_n^C$=peice of data from profile n
$D_n^T$=total data from profile n
$\delta$=unspecified coefficient for imconsistencies
$Score_{n-1}$=previous score
$Score_n$=new score Note that $\delta$ may correspond to a value, such as a decimal value between 0 and 1, although other ranges are possible, whether higher or lower. For example, the value may be a value from about 0 to about 1, inclusively, such as 0.85. The coefficient for inconsistencies, $\delta$, is included to prevent profiles with no relatability from "absorbing" the value of other profiles that are connected thereto. For example, one profile that "follows" nobody on a social networking service could still be "followed" by others. Therefore, information could get "trapped" in a profile that follows no one and theoretically could not escape. If one were to set $\delta$ to high (e.g. very close to or 1), then this process may not come to a stop, such as via an endless loop, or take a long time to complete and the scores may take a long time to converge (i.e. reach a steady state of a Markov chain representing profiles and their content). Conversely, if one were to set the $\delta$ too low (e.g. very close to or 0), then the scores may be erratic, both above and below the average, and may not converge or converge after a long period of time. Therefore, $\delta$ can be determined as a weighted average between those two bounds or extremes. In the formula, a leftmost parenthesis is informative of a probability of no relatedness even if hyperlinks are not identical, whereas a rightmost brackets are informative of a probability of relatedness based on inputs for each profile, such as social networking posts. For example, if one were to look at all the words (e.g. natural language) used by two social media participants, then one can use those words and where they overlap as one input into this process.

In a block 308, the scoring cluster or the engine determines whether the score is roughly equivalent to a previous score, if any, such as based on comparing the score to a threshold, which may be the old score, based on a set of criteria, such as value or others. For example, if the difference in score values is less than or equal 0.001, then that may be considered roughly equal. If the score is not roughly equivalent to the previous score, then the block 306 is performed. If the score is roughly equivalent to the previous score, then a block 310 is performed In a block 310, the scoring cluster or the engine take an action, such as writing the score to a data structure, whether local to or remote from the scoring cluster, sending the score outside of the scoring cluster, such as to another cluster, or others.

Figure 4:
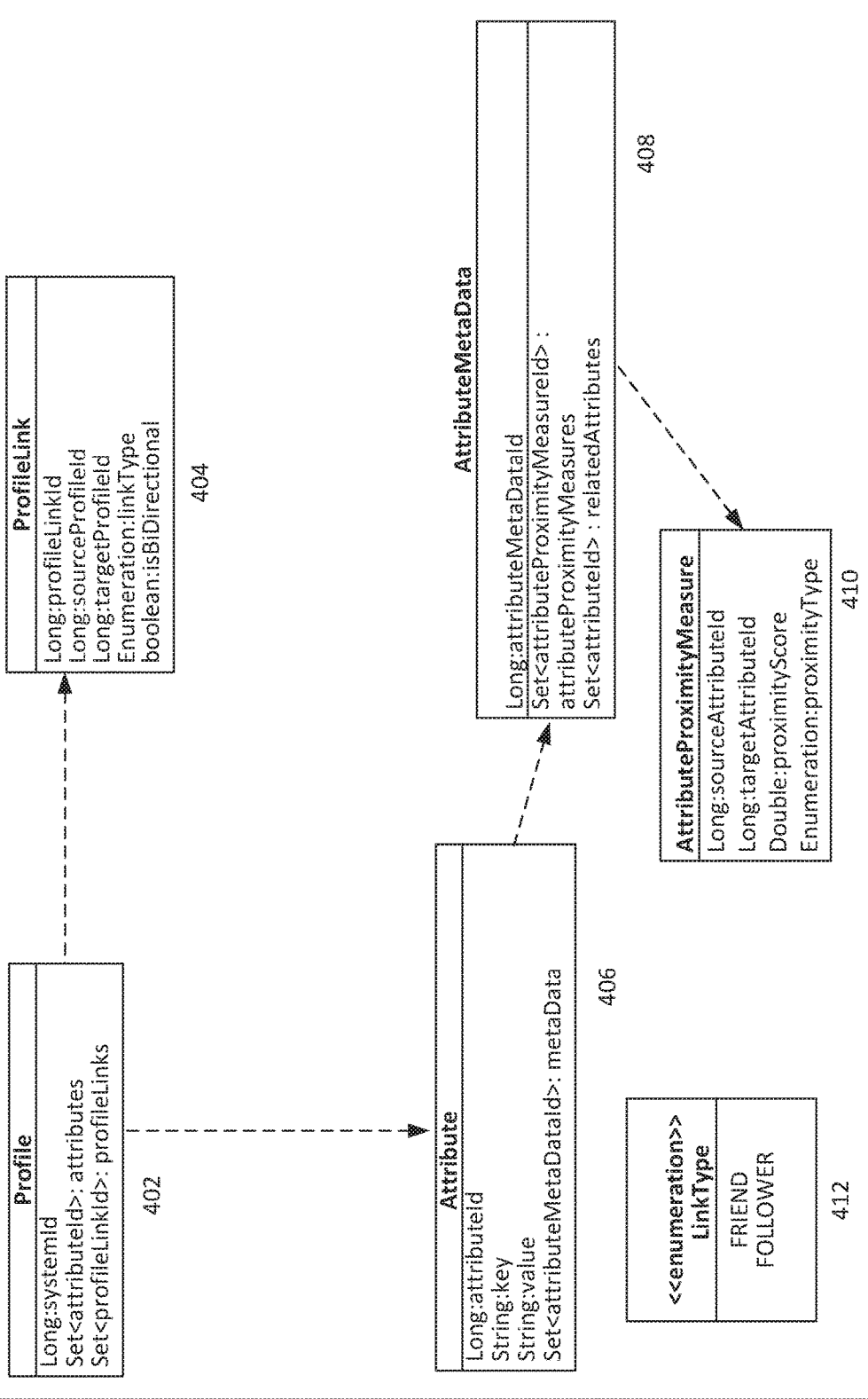
FIG. 4 shows a diagram of an embodiment of a data organization according to this disclosure.

FIG. 4 shows a diagram of an embodiment of a data organization according to this disclosure. In particular, a data organization 400 depicts a schema of a data structure for implementing a profile storage at least for use, as disclosed herein. Although the data organization 400 is shown as a standard class diagram, which can directly relate to a relational storage system, in other embodiments, several separate or distinct storage systems including scalable key value stores and a graph store may be used to store a similar or same data structure. Such systems can include relational, key value, document base, or other storage types. A beneficial aspect of the data organization 400 is that the data structure and its storage of links between profiles and attributes. However, note that there are many ways to store this type of data.

The data organization 400 includes a profile object 402, a profile link object 404, an attribute object 406, an attribute metadata object 408, an attribute proximity measure object 410, and an enumeration link type object 412. The object 402 is logically related to the object 404 and the object 406, whether directly or indirectly. The object 406 is logically related to the object 408, whether directly or indirectly. The object 408 is logically related to the object 410, whether directly or indirectly. In some embodiments, any combinatory permutation of any logical relationship between objects of the data organization 400 is possible.

The object 402 can be a table in a database with a unique system numeric identifier, a set of attributes tagging a social networking profile, and a set of profile links representing connections to other social networking profiles, within a same or different social networking service. The object 402 contains multiple profile link references referring to the objects 404, when more than one are used, and multiple attribute references referring to the objects 406, when more than one are used. For example, the object 402 can be manifested as per below:

Data Example 402 (Profile)
Data

| systemId | attributes | profileLinks |
|----------|------------|--------------|
| 0        | [0,1]      | [1]          |
| 1        |            | [0]          |

Description
Profile.systemId is a number that is globally unique in a system for a profile, in this particular storage format it is a Primary Key for the Profile (402) table.
Profile.attributes is an array of foreign keys identifying one or more Attribute objects (406)
Profile.profileLinks is an array of foreign keys identifying one or more ProfileLink objects (404)

Blima Data Example 404 (ProfileLink)->
Data

| profileLinkId | source=ProfileId | targetProfileId | linkType | isBiDirectional |
|---------------|------------------|-----------------|----------|-----------------|
| 10            | 0                | 1               | FRIEND   | TRUE            |
| 11            | 1                | 0               | FOLLOWER | FALSE           |

Description
ProfileLink.profileLinkId is a number that is globally unique in a system for a ProfileLink (404), in this particular storage format it is a Primary Key for the ProfileLink (404) table.
ProfileLink.sourceProfileId is a foreign key identifying a Profile (406). This is also a source profile of a unidirectional link.
ProfileLink.targetProfileId is a foreign key identifying a Profile (406). This is a target profile of a unidirectional link.
ProfileLink.linkType is a String foreign key into LinkType (412). This describes a type of link for a purpose of conditional processing, grouping, and filtration.
ProfileLink.isBiDirectional is a Boolean for denoting whether or not this particular link is bidirectional, i.e., this link may be processed as if it were two logical links of the same data with the source and target reversed.

The object 404 can be a table in a database. Each object 402 has a unique numeric identifier, a reference to a source profile and a target profile as well as a enumeration describing a link type and a Boolean value to denote if that relationship is bidirectional. For example, the object 404 can be manifested as per below:

Blima Data Example 404 (ProfileLink)->
Data

| profileLinkId | source-ProfileId | targetProfileId | linkType | isBiDirectional |
|---------------|------------------|-----------------|----------|-----------------|
| 10            | 0                | 1               | FRIEND   | TRUE            |
| 11            | 1                | 0               | FOLLOWER | FALSE           |

Description
ProfileLink.profileLinkId is a number that is globally unique in a system for a ProfileLink (404), in this particular storage format it is a Primary Key for the ProfileLink (404) table.
ProfileLink.sourceProfileId is a foreign key identifying a Profile (406). This is also a source profile of a unidirectional link.
ProfileLink.targetProfileId is a foreign key identifying a Profile (406). This is a target profile of a unidirectional link.
ProfileLink.linkType is a String foreign key into LinkType (412). This describes the type of link for the purposes of conditional processing, grouping, and filtration.
ProfileLink.isBiDirectional is a Boolean for denoting weather or not this particular link is bidirectional. IE: This link may be processed as if it were two logical links of the same data with a source and target reversed.

The object 406 can be a table in a database. The object 406 can contain a unique numeric attribute identifier, a string key, a string value, and a set of numeric attribute metadata identifiers representing links to the object 408 describing this attribute. For example, the object 406 can be manifested as per below:

Blima Data Example 406 (Attribute)->
Data

| attributeId | key | value | metaData |
|---|---|---|---|
| 20 | Name | Brian M. Lima | [30] |
| 21 | Address | 71 Turo Square | [31] |

Description
Attribute.attributeId is a number that is globally unique in a system for an Attribute (406), in this particular storage format it is a Primary Key for an Attribute (406) table.
Attribute.key is a String key denoting what the attribute is. name, address, photo, etc.
Attribute.value is a value of this attribute in a string format.
Attribute.metaData is an array of Foreign keys into an AttributeMetaData table (408)

The object 408 can be a table in a database storing data describing an attribute object. The object 408 contains a unique numeric identifier, a set of attribute proximity measure identifiers describing other attributes in a system that have a 'Proximity Score' to this attribute, and a set of attribute identifiers describing related attributes. For example, the object 408 can be manifested as per below:
Blima Data Example 408 (AttributeMetaData)->
Data

| attributeMetaId | attributeProximityMeasures | relatedAttributes |
|---|---|---|
| 30 | [40] | [20] |
| 31 | [41] | [21] |

Description
AttributeMetaData.attributeMetaId is a number that is globally unique in a system for a AttributeMetaData (408), in this particular storage format it is a Primary Key for the AttributeMetaData (408) table.
AttributeMetaData.attributeProximityMeasures is an array of Foreign keys into an AttributeProximityMeasure table (410)
AttributeMetaData.relatedAttributes is an array of Foreign Keys into an Attribute (406) table. This provides a way to link attributes.

The object 410 can be a table in a database storing numeric data relations between attributes either in or between attributes. These measures can be between attributes in a single social networking profile or across several social networking profiles. For example, the object 410 can be manifested as per below:
Blima Data Example 410 (AttributeProximityMeasure)->
Data

| sourceAttributeId | targetAttributeId | proximityScore | proximityType |
|---|---|---|---|
| 20 | 21 | 1.0 | PHYSICAL |
| 21 | 20 | 0.5 | TRACE_VALUE |

Description
AttributeProximityMeasure.sourceAttributeId is a Foreign Key into an Attribute table (406) this is a source of a proximity relationship stored here.
AttributeProximityMeasure.targetAttributeId is a Foreign Key into an Attribute table (406) this is a target of a proximity relationship stored.
AttributeProximityMeasure.proximityScore is a double numeric value. This is a score stored.
AttributeProximityMeasure.proximityType is a string denoting a type of score stored.

The object 412 is a set of controlled strings denoting a type of link between the objects 402. For example, the object 412 can be manifested as per below:
Blima Data Example 412 (LinkType)->
Data

| value |
|---|
| FRIEND |
| FOLLOWER |

Description
LinkType.value is a string unique to a LinkType table denoting a type of link. This is a value used for a purpose of conditional processing, grouping, and filtration.

Figure 5:
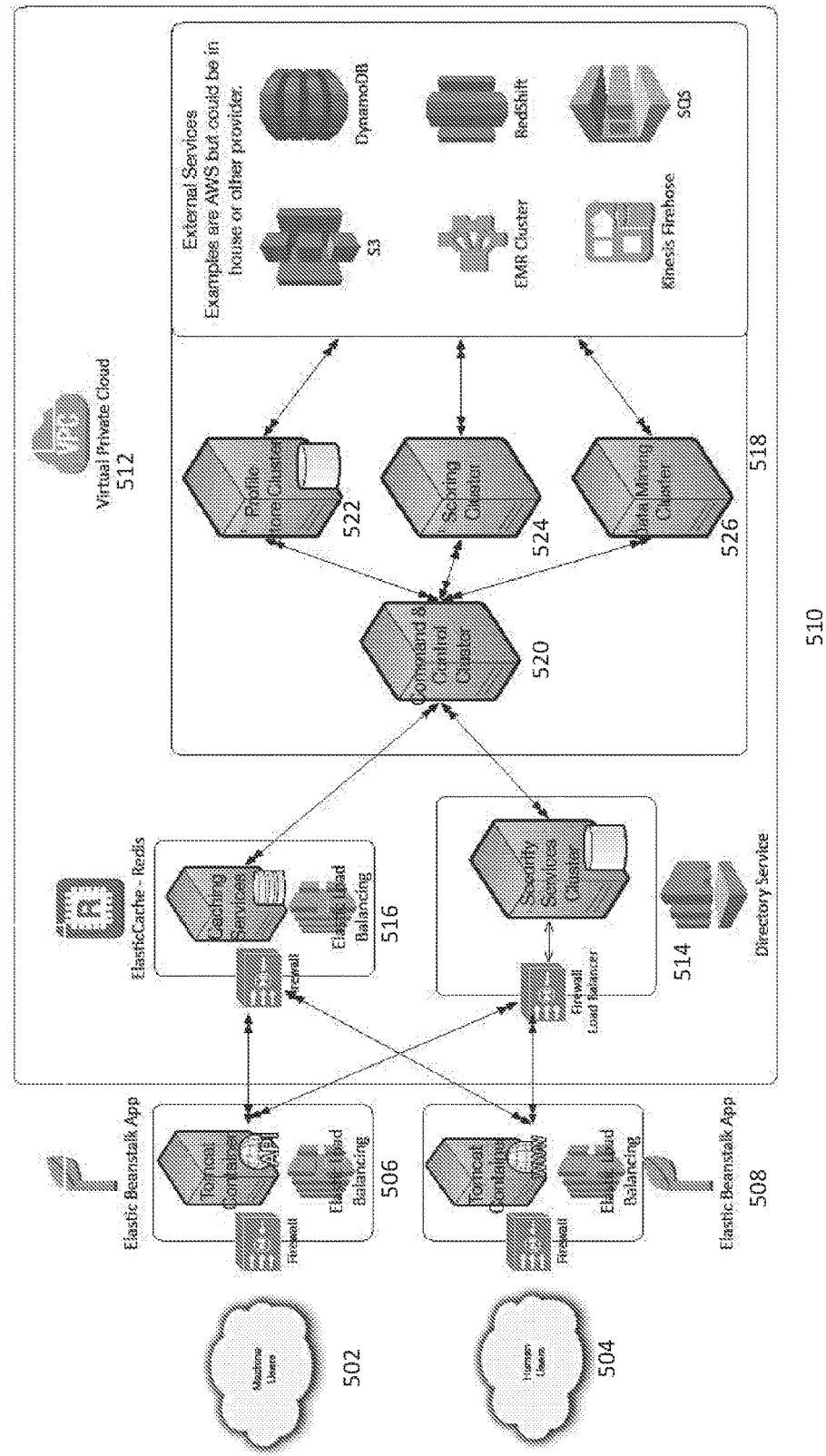
FIG. 5 shows a schema of an embodiment of a network-based system for generating a score according to this disclosure.

FIG. 5 shows a schema of an embodiment of a network-based system for generating a score according to this disclosure. In particular, a network-based system 500 employs the data organization 400 to performs various techniques, as disclosed herein, such as generating a score based on a plurality of social networking profiles.

The system 500 includes a plurality of machine users 502, a plurality of human users 504, a server 506, a server 508, a logical entity 510, a VPC 512, a security service cluster 514, a caching service cluster 516, a set of server clusters 518, a control cluster 520, a profile store cluster 522, a scoring cluster 524, and a data mining cluster 526. Note that the system 500 is a standard three tier distributed web application, where many, most, or all services are independently clustered for scalability, where security depends on a Lightweight Directory Access Protocol (LDAP) configuration, a VPC configuration, a Linux configuration, a set of appropriately configured firewalls and both active and passive intrusion detection systems. However, note that this architecture is illustrative and other architectures are possible.

The machine users 502 include programs and other software that use the system 500 via an API. The human users 504 include human beings operating computing devices to use the system 500 via local or network-based browsers interpreting a Hypertext Markup Language (HTML) code and a JavaScript code of the system 500. As such, with respect to the machine users 502, the server 506 hosts a servlet web container, such as a Tomcat container, that serves a web application with REST services available via Hypertext Transfer Protocol (HTTPS) to allow other software systems to interface with the system 500. The server 506 is managed via a computing orchestration service, such as Amazon Web Services (AWS) Elastic Beanstalk. For example, the computing orchestration service manages load balancing, deployment, and configuration of a web services cluster. The server 506 is in communication, whether direct or indirect, with a firewall appliance or a software firewall only allowing HTTP/HTTPS traffic from a wide area network. Similarly, with respect to the human users 504, the server 508 hosts a servlet web container, such as a Tomcat container, that serves a web application with a HTML content available via HTTPS to allow the human users to use the system 500. The server 508 is managed via a computing orchestration service, whether same or different from the server 506, such as AWS Elastic Beanstalk. For example, the computing orchestration service manages load balancing, deployment, and configuration of a web services cluster. The server 508 is in communication, whether direct or indirect, with a firewall appliance or software firewall only allowing HTTP/HTTPS traffic from the wide area network.

The entity 510 hosts the VPC 512 where the security service cluster 514, the caching service cluster 516, the set of server clusters 518, the control cluster 520, the profile store cluster 522, the scoring cluster 524, and the data mining cluster 526 are logically situated. The VPC 512 is a private network in a cloud environment. For example, some, most, or all network traffic is controlled for security purposes for any server or service in the VPC 512.

The security service cluster 514 includes a cluster of servers dedicated to user, role, and object permissions. This allows the applications and services within the overall application to enforce security requirements. Although an AWS Directory service is used, note that a LDAP-based process and or any other security provider process could be used. The server 506 and the server 508, such as via Tomcat web applications, communicate with the security service cluster 514 to enforce security requirements. This allows the system 500 to check for resource permissions, such as access to specific data, services, and authentication.

The caching service cluster 516 provide a fast access storage lookup for resources that do not need to be recomputed on every request. This increases application speed and reduces costs by lowering the average number of computing cycles and or expensive resources user per request. The caching service cluster 516 is implemented as a fully managed in-memory data store and cache service that improves the performance of web applications by retrieving information from managed in-memory caches, instead of relying entirely on slower disk-based databases. For example, the caching service cluster 516 can use AWS ElastiCache, which is a managed version of Redis, which may include an in-memory key value store. The server 506 and the server 508 communicate with the caching service cluster 516, such as via Tomcat web applications, to avoid recalculating anything on successive requests. This allows the system 500 to check for resources, such as JavaScript Object Notation (JSON) data in the cache, and only submit requests for new data if the system has not cached it yet.

The set of server clusters 518 includes the control cluster 520, the profile store cluster 522, the scoring cluster 524, and the data mining cluster 526. The control cluster 520 is in communication with the security service cluster 514 and the caching service cluster 516 along different logical or communication paths. The control cluster 520 is logically situated between the security service cluster 514 and the caching service cluster 516 and the profile store cluster 522, the scoring cluster 524, and the data mining cluster 526.

The control cluster 520 includes a cluster of servers or services that receive requests for data, such as JSON over HTTPS or others, and manages a coordination of several backend services to respond to the requests for data either synchronously or asynchronously. For example, the control cluster 520 controls scoring of a network of profiles which include retrieving the network of profiles from the profile store cluster 522, passing the network of profiles to the scoring cluster 524, and pushing a set of results from the scoring cluster 524 into the caching service cluster 516. This allows for a complexity of operations and timing to be obfuscated from various services that need data but do not care how that data is found or determined. The control cluster 520 communicates, whether directly or indirectly, based on network communications to the control cluster 520 that related to jobs that the system 500 needs to do that require multiple resources to be managed, such as a request for a network path and scores between two profiles. If not cached, then this process involves mining data, storing the mined data in the profile store cluster 522 and the scoring cluster 524. For example, the control cluster 520 can receive or send communications that include authentication, requesting data and or checking to see if data is available. This allows for an asynchronous operation of various backend processes whose nature is inherently not real time. Such communications can be over HTTPS or network port. Note that such communications may utilize REST API's over HTTPS.

The profile store cluster 522 includes a cluster of servers that provide a distributed storage system for profile data, such as via a thin REST API that relies on AWS Dynamo DB and AWS Redshift to store and retrieve profile data. Note that such AWS services are illustrative and any storage system that can store a relational model can work since this configuration is an abstraction of Create, Read, Update and Delete (CRUD) operations related to the profiles. The control cluster 520 communicates with the profile store cluster 522, whether directly or indirectly, over a REST API. This communication model can be similar to a communication model between a client and a relational database and involves various CRUD operations and existence tests. For example, on existence, JSON Profile data is returned from the profile store cluster 522 to the control cluster 520. The profile data can also be added by the control cluster 520. As an example, the data mining cluster 526 may return new social media data for a profile and the control cluster 520 may call the profile store 522 and request the profile store 522 to store that data for future reference.

The scoring cluster 524 includes a cluster of servers that provide a distributed scoring system for profile data, such as via a thin REST API that relies on AWS Redshift to store. A manner in which this service scores is configurable and processing systems used vary depending on use and implementation. For example, an in memory representation is used to score however in larger systems this would be handled by Apache SPARK or an optimized map-reduce or map-reduce like system. The control cluster 520 communicates with the scoring cluster 524, whether directly or indirectly, over a REST API. For example, the control cluster 520 submits profile data and a scoring configuration in a JSON POST request and receive back a result as a JSON document over HTTPS. In some embodiments, the scoring cluster 524 can run asynchronously.

The data mining cluster 526 includes a cluster of servers that provide a distributed data import and disambiguation system for profile data. The data mining cluster 526 manages the process of pulling data from social networking service data sources in parallel. This pulled data is then returned to the control cluster 520, which decides what to do with the pulled data next. The data mining cluster 526 can also watch feed data, such as periodically, and notify the control cluster 520 that new data is available. The control cluster 520 communicates with the data mining cluster 526, whether directly or indirectly, over a REST API. For example, the control cluster 520 submits a request for data either in bulk or as related to a specific profile, such as requesting the system 500 to find data on a profile that has yet to be populated, in a JSON POST request and receive back a results as a JSON document over HTTPS. In some embodiments, the data mining cluster 526 can monitor social networking service data streams and notify the control cluster 520 when new data is detected.

Note that although the system 500 relies on AWS services, the system 500 can be configured such that any of such services can be swapped out at any time for an in-house implementation or other services provides by AWS or another cloud computing provider, such as Microsoft Cloud.

Figure 6:
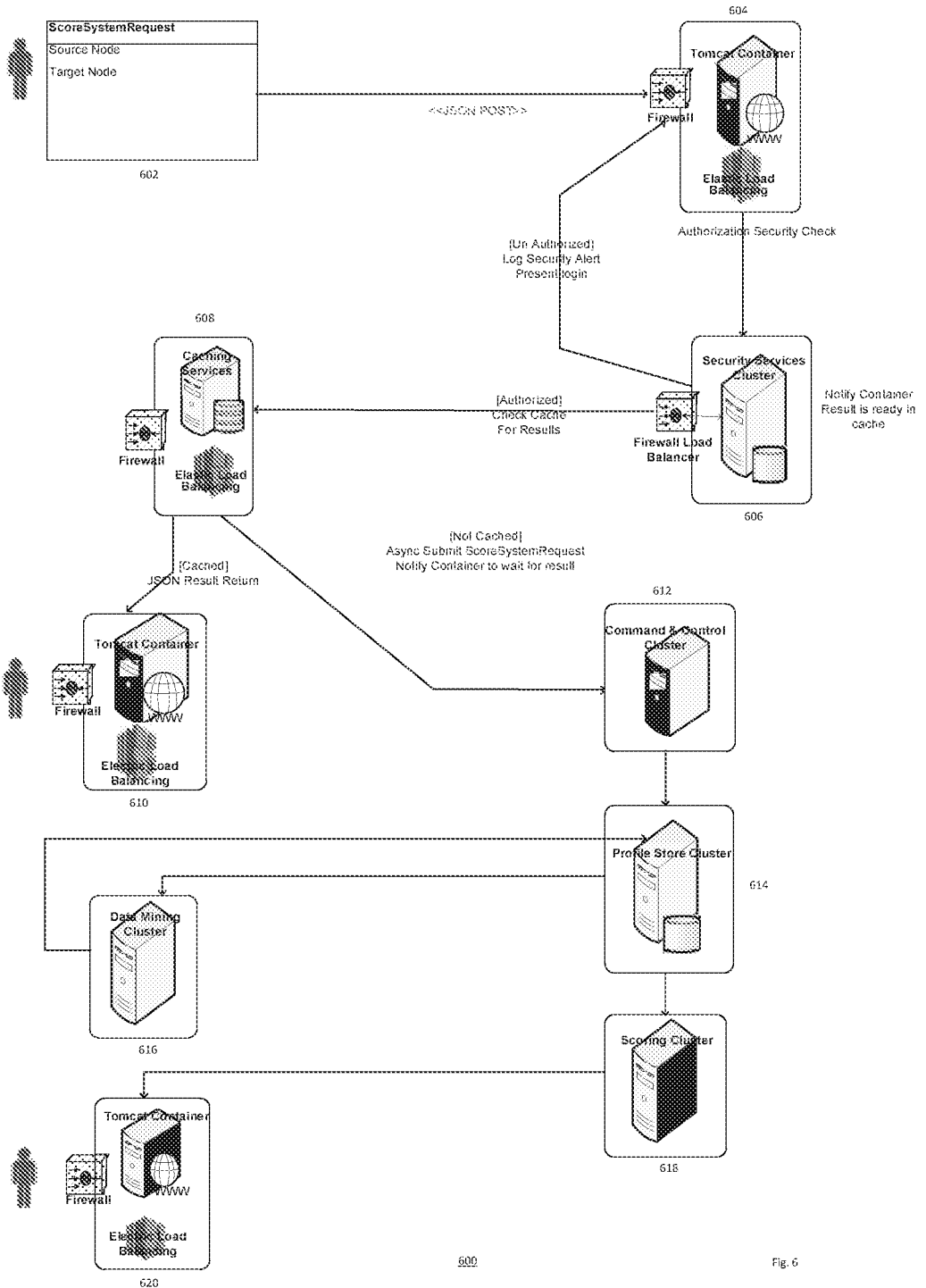
FIG. 6 shows a diagram of an embodiment of a network-based sequence of score formation according to this disclosure.

FIG. 6 shows a diagram of an embodiment of a network-based sequence of score formation according to this disclosure. In particular, a sequence 600 employs various actions by various entities, as noted in a plurality of points 602-620. For example, the sequence 600 can be used in context with the system 500 to implement a submission of a scoring request and a response of the scoring request. Note that various steps, such as request, mine for data, score, respond, or others, can be implemented in any language or architecture that accomplished a similar or same process. Further, the sequence 600 includes components that may be distributed and clustered for high availability and scaling.

At a point 602, a user places a request that has a source node and a target node that is marshaled into JSON and sent via HTTPS POST to the system 500 REST API, where the firewall, whether hardware or software, may reject some, most, or all traffic except HTTP and HTTPS.

At a point 604, a Tomcat container runs, which may include a pool of servers running Apache Tomcat which is a java web application container on a CentOs OS. The container represents a HTML and JavaScript interface accessible by the human users 504 through a web browser. The request is checked to ensure that the request has been authenticated and the user/role has permission to read the data necessary to complete the request.

At a point 608, the security service cluster 514 sends back the request to the Tomcat container if the user does not have enough permissions to complete the request or is not authenticated. Otherwise, the security service cluster 514 passes the request to the caching service cluster 516 to check for a recalculated result via HTTPS REST API.

At a point 610, the caching service cluster 516 determines if a response to the request is cached or not cached. If cached, then the JSON result is returned to the Tomcat container and then a web browser or an HTML client for display.

At a point 612, if a response to the request is not cached, then the request is forwarded to the control cluster 520 and a client, such as from the point 602, may be notified that the request is being processed. The control cluster 520 contacts the profile store cluster 522 to identify and retrieve the necessary data.

At a point 614, the profile store cluster 522 determines whether the necessary data exists or does not exist. If the necessary data exists, then the profile store cluster 522 forwards the necessary data to the scoring cluster 524 for scoring. If the necessary data does not exist, then the profile store cluster 522 requests the data mining cluster 526 to retrieve or mine for the necessary data.

At a point 616, the data mining cluster 526 retrieves or mines the necessary data, such as profile data, and enters into the profile store cluster 522.

At a point 618, the scoring cluster 524 scores the necessary data, as disclosed herein and sends a JSON document to a waiting Tomcat container.

At a point 620, the Tomcat container outputs the JSON document to a client, such as from the point 602, for display, such as via a web browser.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
   receiving, via a server, over a wide area network, from a client, a plurality of social networking service profile identifiers input into a plurality of alphanumeric input fields on a browser running on an operating system of the client and a time unit value input into a numeric input field on the browser;
   writing, via the server, the social networking service profile identifiers and the time unit value into a data structure in accordance with a schema of the data structure;
   querying, via the server, over the wide area network, a social networking service periodically based on the social networking service profile identifiers sourced from the data structure and according to the time unit value sourced from the data structure such that a plurality of status updates of a plurality of social networking profiles corresponding to the social networking service profile identifiers are read via the server, wherein the social networking profiles are not connected directly;
   copying, via the server, over the wide area network, the status updates;
   writing, via the server, the status updates into the data structure in accordance with the schema such that the status updates correspond to the social networking service profile identifiers stored in the data structure;
   retrieving, via the server, the status updates and the social networking service profile identifiers from the data structure;
   inputting, via the server, the status updates and the social networking service profile identifiers into a running logic;
   generating, via the server, a value based on the running logic;
   evaluating, via the server, the value against a threshold;
   when the value satisfies the threshold, taking, via the server, a first action; and
   when the value does not satisfy the threshold, taking a second action.

2. The method of claim 1, wherein the server is further configured to serve a page depicting a plurality of alphanumeric input fields and a numeric input field to the browser, wherein at least one of:
   wherein the first action includes updating, via the server, over the wide area network, the page such that the page depicts the value,
   wherein the server runs a plurality of threads corresponding to the social networking service profile identifiers, wherein the querying is via the threads, or
   wherein the page is a first page, wherein the first action includes serving, via the server, over the wide area network, a second page to the browser, wherein the second page depicts the value.

3. The method of claim 2, wherein the first action includes updating, via the server, over the wide area network, the page such that the page depicts the value.

4. The method of claim 1, wherein the querying is parallel with respect to the social networking profiles.

5. The method of claim 4, wherein the status updates are read in parallel.

6. The method of claim 4, wherein the server runs a plurality of threads corresponding to the social networking service profile identifiers, wherein the querying is via the threads.

7. The method of claim 4, wherein the server includes a plurality of processing cores, wherein the querying is via the cores.

8. The method of claim 1, wherein the querying is serial with respect to the social networking profiles.

9. The method of claim 8, wherein the status updates are read serially.

10. The method of claim 8, wherein the server runs a plurality of threads corresponding to the social networking service profile identifiers, wherein the querying is via the threads.

11. The method of claim 8, wherein the server includes a plurality of processing cores, wherein the querying is via the cores.

12. The method of claim 1, wherein the first action includes inputting, via the server, the value into an analytic process local to the server.

13. The method of claim 1, wherein the running logic includes a formula, wherein the value is generated based on the formula, wherein the formula is $$Score_n = \left(\frac{1-\delta}{D_1^T + D_2^T + \ldots + D_n^T}\right) + \delta\left\{\left(\frac{D_1^C}{D_1^T} + \frac{D_2^C}{D_2^T} + \ldots + \frac{D_n^C}{D_n^T}\right) + \left(\frac{Score_{n-1}}{D_1^T + D_2^T + \ldots + D_n^T}\right)\right\}, 0 \leq n \leq \infty.$$

14. The method of claim 13, wherein the running logic includes an engine running an operating system of the server, wherein the engine hosts the formula.

15. The method of claim 1, wherein the data structure is an in-memory database.

16. The method of claim 1, wherein the first action includes writing, via the server, the value into the data structure such that the value corresponds to the social networking service profile identifiers in the data structure.

17. The method of claim 1, wherein the server is a first server, and further comprising:
accessing, via the first server, the data structure stored on a second server, wherein the writing is based on the accessing, wherein the first server is in communication with the second server based on a representation state transfer application programming interface.

18. The method of claim 17, wherein the first server and the second server are situated within a virtual private cloud logically.

19. The method of claim 1, wherein the server is a first server, and further comprising:
accessing, via the first server, the running logic stored on a second server, wherein the inputting is based on the accessing, wherein the first server is in communication with the second server based on a representation state transfer application programming interface.

20. The method of claim 19, wherein the second server is situated within a cluster logically, wherein the first server is external to the cluster, wherein the cluster is run asynchronously.

21. The method of claim 20, wherein the first server and the second server are situated within a virtual private cloud logically.

22. The method of claim 1, further comprising:
disambiguating, via the server, the status updates, wherein the writing the status updates into the data structure is based on the disambiguating.

23. The method of claim 1, wherein the second action includes repeating the generating iteratively until the value satisfies the threshold such that the first action can be performed.

24. The method of claim 1, wherein the first action includes caching, via the server, the value based on a set of criteria such that the server outputs the value, as cached, when requested via the client over the wide area network and when the value satisfies the set of criteria at a time when the request is received via the server over the wide area network from the client.

25. The method of claim 1, wherein the data structure is a NoSQL database.

26. The method of claim 2, further comprising:
transliterating, via the server, an alphanumeric input field of the alphanumeric input fields before the receiving.

27. The method of claim 1, further comprising:
validating, via the server, a social networking service profile identifier of the social networking service profile identifiers before the receiving.

28. The method of claim 1, wherein the server hosts a bot performing the querying, the copying, the writing, the inputting, and the generating.

29. The method of claim 28, wherein the bot performs the evaluating and the taking.

* * * * *